(12) United States Patent
Schumann et al.

(10) Patent No.: US 7,896,694 B2
(45) Date of Patent: Mar. 1, 2011

(54) CABLE CONNECTING DEVICE AND CONNECTING APPARATUS WITH CABLE CONNECTING DEVICES OF THIS KIND

(75) Inventors: Andreas Schumann, Steinenbronn (DE); Gerd Philipp, Boeblingen (DE)

(73) Assignee: Telegaertner Karl Gaertner GmbH, Steinenbronn (DE)

( * ) Notice: Subject to any disclaimer, the term of this patent is extended or adjusted under 35 U.S.C. 154(b) by 0 days.

(21) Appl. No.: 12/660,148

(22) Filed: Feb. 18, 2010

(65) Prior Publication Data
US 2010/0197167 A1 Aug. 5, 2010

Related U.S. Application Data

(63) Continuation of application No. PCT/EP2008/002918, filed on Apr. 12, 2008.

(30) Foreign Application Priority Data
Aug. 21, 2007 (DE) .................. 10 2007 040 496

(51) Int. Cl.
H01R 13/73 (2006.01)
(52) U.S. Cl. .................................................. 439/571
(58) Field of Classification Search ............... 439/571, 439/188, 540.1, 466, 468, 247, 364, 76.2, 439/342; 174/65 R, 152 R, 135
See application file for complete search history.

(56) References Cited

U.S. PATENT DOCUMENTS

| | | | |
|---|---|---|---|
| 4,990,094 A | 2/1991 | Chandler et al. | |
| 5,104,333 A * | 4/1992 | Hatagishi et al. | 439/342 |
| 5,178,554 A | 1/1993 | Siemon et al. | |
| 5,300,734 A * | 4/1994 | Suzuki | 174/152 G |
| 5,971,796 A * | 10/1999 | Duhr | 439/445 |
| 6,095,852 A * | 8/2000 | Gregory, II | 439/540.1 |
| 6,394,844 B1 * | 5/2002 | Valero et al. | 439/607.07 |
| 6,684,179 B1 | 1/2004 | David | |
| 7,689,089 B2 * | 3/2010 | Wagner et al. | 385/135 |
| 2005/0159036 A1 | 7/2005 | Caveney et al. | |
| 2009/0147495 A1 | 6/2009 | Hetzer et al. | |

FOREIGN PATENT DOCUMENTS

| | | |
|---|---|---|
| DE | 691 15 863 | 5/1996 |
| DE | 200 12 572 | 2/2001 |
| DE | 10 2005 038 540 | 1/2007 |

* cited by examiner

*Primary Examiner*—Jean F Duverne
(74) *Attorney, Agent, or Firm*—Lipsitz & McAllister, LLC

(57) ABSTRACT

The invention relates to a cable connecting device for a connecting apparatus for the variable connection of cables, having a connecting module which has cable connecting elements for detachably connecting two cables, and having a module carrier which can be detachably connected to the connecting module and can be detachably fixed to a holding device of the connecting apparatus. The invention also relates to a connecting apparatus with a cable connecting device of this kind. In order to develop the connecting apparatus and the cable connecting device in such a way that mounting of said devices is simplified, with the connecting module being reliably held on the module carrier, it is proposed according to the invention that the connecting module can be inserted into a receiving passage in the module carrier in a mounting direction and can be latched to the module carrier in a latching position.

18 Claims, 4 Drawing Sheets

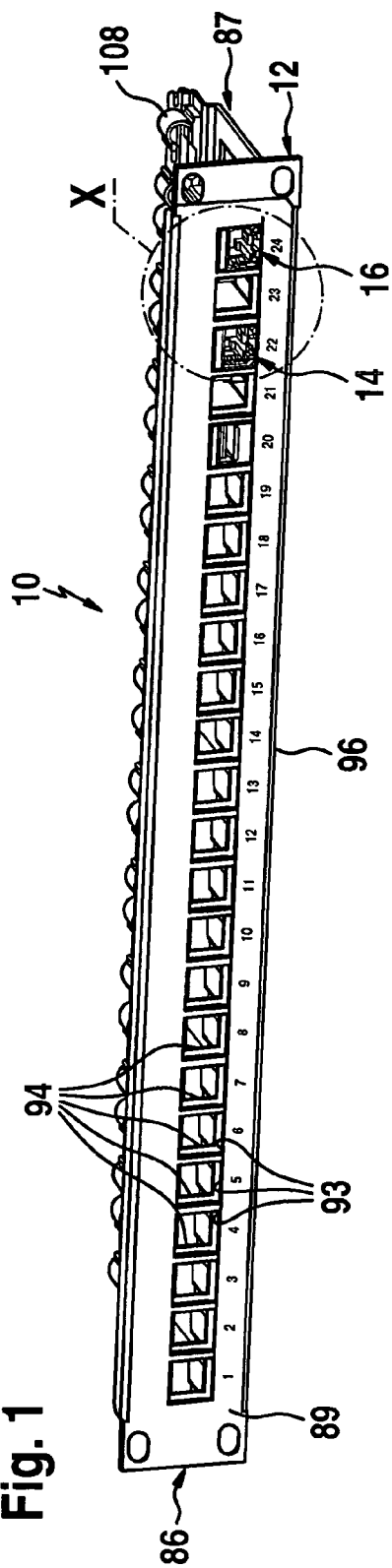
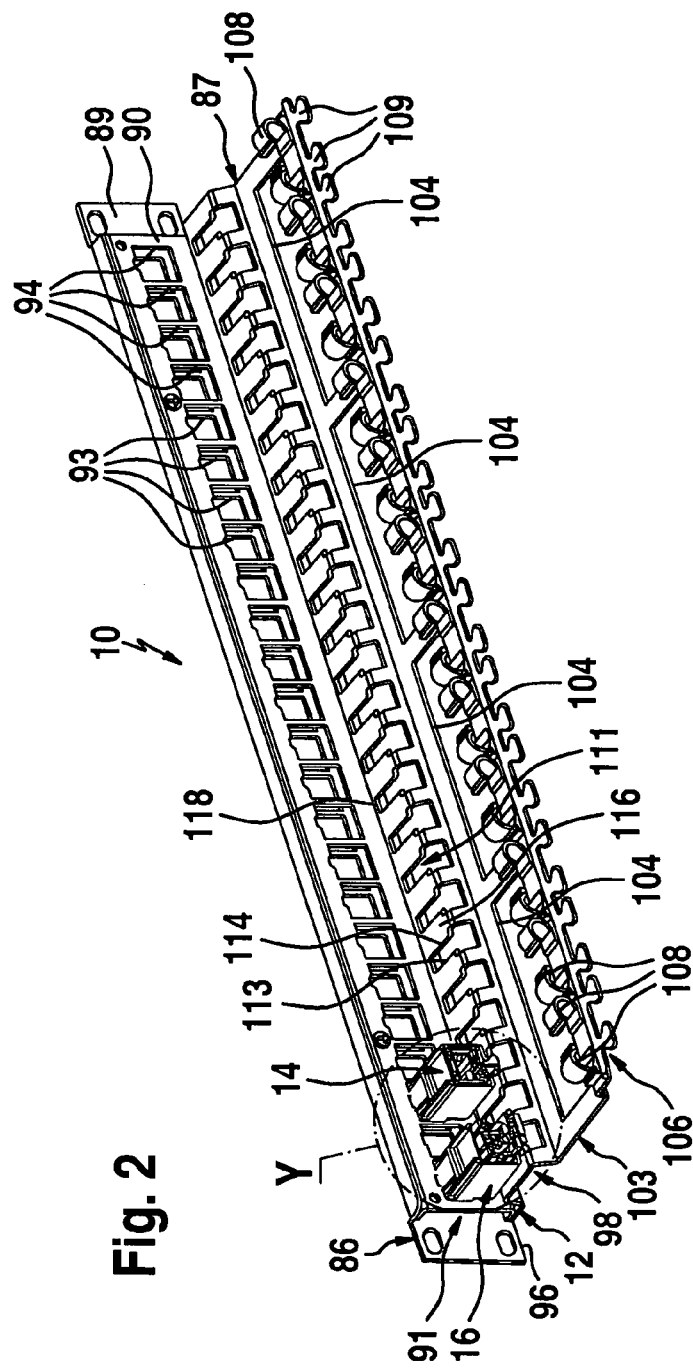

CABLE CONNECTING DEVICE AND CONNECTING APPARATUS WITH CABLE CONNECTING DEVICES OF THIS KIND

This application is a continuation of international application number PCT/EP2008/002918 filed on Apr. 12, 2008.

The present disclosure relates to the subject matter disclosed in international application number PCT/EP2008/002918 of Apr. 12, 2008 and German application number 10 2007 040 496.6 of Aug. 21, 2007, which are incorporated herein by reference in their entirety and for all purposes.

BACKGROUND OF THE INVENTION

The invention relates to a cable connecting device for a connecting apparatus for the variable connection of cables, having a connecting module which has cable connecting elements for detachably connecting two cables, and having a module carrier which can be detachably connected to the connecting module and can be detachably fixed to a holding device of the connecting apparatus.

The invention also relates to a connecting apparatus for the variable connection of cables, in particular telecommunications and data transmission cables, having at least one cable connecting device of the above type, and having a holding device for detachably fixing the module carrier of the cable connecting device to the connecting apparatus.

Connecting apparatuses for the variable connection of cables are often also called patch panels or else jumpering panels. They can be used to variably connect cables, in particular telecommunications and data connection cables, to one another. The connecting apparatuses usually have a holding device which may be configured, for example, in the form of a holding frame or a front plate and is often accommodated in a 19-inch distributor cabinet. A large number of cable connecting devices can be fixed to the holding device, and a first cable can be connected to the rear of the cable connecting devices.

The front of the cable connecting device provides the possibility of detachably connecting a second cable to the first cable. The cable connecting device has cable connecting elements for this purpose. Said cable connecting elements may be provided, for example, in the form of sockets which are disposed at the front, and conductor receiving parts which are disposed at the rear, and into which the individual conductors of a cable can be inserted.

Two cables are electrically connected by means of a connecting module of the cable connecting device. In many cases, the connecting module is mechanically fixed to the holding device of the connecting apparatus with the aid of a module carrier which can be detachably connected to the connecting module and can be fixed to the holding device.

It is an object of the present invention to develop a cable connecting device and also a connecting apparatus having cable connecting devices of this kind, of the type mentioned in the introduction, in such a way that mounting of said cable connecting device is simplified, with the connecting module being reliably held on the corresponding module carrier.

SUMMARY OF THE INVENTION

In the case of a cable connecting device of the type mentioned in the introduction, this object is achieved, according to the invention, in that the connecting module can be inserted into a receiving passage in the module carrier in a mounting direction and can be latched to the module carrier in a latching position.

In order to mount the cable connecting device, the connecting module can be inserted into the receiving passage in the module carrier, with said connecting module being latched to the module carrier. The latching connection may be formed to be detachable, so that the connecting module can be detached from the module carrier again at any time as required.

Before the connecting module is inserted into the module carrier, a first cable can be connected to the rear of the connecting module. Appropriate connection options are known to the person skilled in the art. After connection of the first cable to the connecting module, said connecting module can be inserted into the receiving passage until it reaches a latching position in which it is latched to the module carrier. The mounted cable connecting device can then be fixed to the holding device of the connecting apparatus. A second cable can then be connected to the front of the cable connecting device, said second cable then being electrically connected to the first cable by means of the connecting module.

The provision of a receiving passage provides a connection, which can be mechanically loaded, between the connecting module and the module carrier, said connection also being suitable for use in the harsh environmental conditions as prevail in particular when the cable connecting device and the associated connecting apparatus are used in production and assembly plants. The receiving passage permits vibration-resistant and firm disposition of the connecting module on the module carrier.

It is advantageous when the receiving passage has two side walls which are situated opposite one another and on which in each case at least one latching means is disposed, said latching means interacting with a corresponding latching means of the connecting module in order to establish a latching connection. In a configuration of this type, the receiving passage and the connecting module each have, on opposite sides, latching means for establishing a preferably detachable latching connection. On account of the location of the latching means on opposite side walls of the receiving passage, the connecting module is held in the receiving passage in a particularly reliable manner after it has reached its latching position.

In an advantageous embodiment, the latching means, which are disposed on side walls of the receiving passage that are situated opposite one another, are formed as latching projections which each interact with a latching receptacle of the connecting module. The connecting module therefore has a latching receptacle on each of the outer faces which are directed away from one another, a latching projection of the receiving passage entering said latching receptacle as soon as the connecting module has reached its latching position within the receiving passage.

It is advantageous when the latching projections are disposed adjacent an end face of the receiving passage.

It is particularly advantageous when the receiving passage can be elastically spread transverse to the mounting direction when the module carrier is not fixed to the holding device of the connecting apparatus. By virtue of the possibility of elastically spreading the receiving passage transverse to the mounting direction, insertion of the connecting module into the receiving passage is made easier, in particular, latching projections which are disposed on side walls of the receiving passage can slide along the outside of the connecting module so as to widen the receiving passage, until said latching projections reach a latching receptacle of the connecting module and enter said latching receptacle, the receiving passage again narrowing, so that a reliable latching connection is achieved between the connecting module and the module carrier.

In a particularly preferred embodiment of the cable connecting device according to the invention, the module carrier has blocking elements which block a spreading movement of the receiving passage transverse to the mounting direction when the module carrier is fixed as intended to the holding device of the connecting apparatus. If the connecting module has reached its latching position in the receiving passage, it can, after the module carrier has been fixed to the holding device of the connecting apparatus, no longer be displaced in the receiving passage since the receiving passage can no longer be spread transverse to the mounting direction. Therefore, the latching connection between the connecting module and the module carrier can no longer be detached when the module carrier is fixed to the holding device.

This ensures, in a structurally simple manner, that the connecting module is secured in the module carrier such that it cannot move.

The module carrier preferably surrounds the connecting module in the latching position in the circumferential direction, a gap being formed which extends along the entire module carrier in the mounting direction. The module carrier therefore engages around the connecting module in the circumferential direction. The provision of the gap ensures that the module carrier of annular cross-section can be elastically spread transverse to the mounting direction.

In this case, it is advantageous when the gap extends along a wall of the receiving passage, blocking elements being located on the outer face of this wall, which outer face is directed away from the receiving passage, on both sides of the gap, said blocking elements blocking a spreading movement of the receiving passage transverse to the mounting direction when the module carrier is fixed as intended to the holding device of the connecting apparatus. The receiving passage can therefore be spread transverse to the mounting direction only when the gap width is increased, provided that the module carrier, together with the connecting module, has not yet been fixed to the holding device of the connecting apparatus. After fixing has taken place, the blocking elements of the module carrier, which blocking elements are disposed on the outside of the wall that has the gap, block a spreading movement of the receiving passage.

It is advantageous when the module carrier has two blocking elements which are each formed to have an L-shaped cross-section and comprise a first limb, which protrudes from the wall of the receiving passage that has the gap, and a second limb, which is oriented parallel to the wall of the receiving passage that has the gap, the two second limbs of the blocking elements facing away from one another. The L-shaped blocking elements can each engage around an edge of a corresponding cutout in the holding device of the connecting apparatus, so that the module carrier is locked transverse to the mounting direction by means of the blocking elements and consequently the receiving passage can no longer be spread transverse to the mounting direction after the module carrier is fixed to the holding device.

The blocking elements of the module carrier preferably represent guide parts which interact with a corresponding guide of the holding device.

Further simplification of the mounting of the cable connecting device is achieved in a preferred configuration of the invention in that the module carrier has a stop element against which the connecting module butts in the latching position. The connecting module can therefore be inserted into the receiving passage only until it comes to rest against the stop element of the module carrier. This makes it easier to mount the cable connecting device.

The stop element preferably projects forward out of the receiving passage in the mounting direction. This has the advantage that the connecting module can be seen from the outside when it reaches its latching position. This further simplifies mounting of the cable connecting device.

The stop element is preferably formed as a stop bar against which the connecting module can engage by way of an end face. The stop bar may be disposed, for example, on a protrusion of the module carrier, with the protrusion preferably forming an extension of the top wall of the receiving passage.

In order to fix the module carrier to the holding device of the connecting apparatus, the module carrier has, in an advantageous embodiment of the invention, at least one latching element by which the module carrier can be latched to the holding device. Provision of the latching element makes it easier to fix the module carrier to the holding device, in particular, it is not necessary to use a special tool to ensure a reliable mechanical connection between the module carrier and the holding device.

A latching element is advantageously disposed on the outside of that face of the module carrier which is remote from the gap. The latching element can form a reinforcement for the module carrier on its face which is remote from the gap.

Provision may be made for the latching element to be formed as a latching hook which can be elastically deformed transverse to the mounting direction. This latching hook is preferably integrally connected to a wall of the receiving passage.

It is advantageous when the module carrier is formed as a one-piece shaped plastics part, in particular as an injection-molded part. This permits particularly cost-effective production of the module carrier.

In an advantageous embodiment of the invention, the connecting module projects from the front and/or rear of the receiving passage in the latching position. The length of the receiving passage in the mounting direction is therefore shorter than the length of the connecting module. As a result, the connecting module can be clearly seen in its front and/or rear end region when the module reaches its latching position. It has been found that this makes it easier to mount the cable connecting device.

The connecting module can have a first cable connecting element at the front, with a socket for receiving a corresponding plug. A large number of contact elements can be disposed within the socket, said contact elements interacting with corresponding contact elements of the plug in order to establish an electrical connection between a first cable which is introduced at the rear of the connecting module and a second cable which is inserted into the socket of the connecting module at the front.

The connecting module can have a second cable connecting element at the rear, with a conductor receiving part into which the individual conductors of a cable can be inserted.

As an alternative, provision may be made for the connecting module to be formed as a coupling part which has a respective socket at the front and rear for receiving a corresponding plug. In particular, provision may be made for the connecting module to be in the form of a USB coupling into which a respective USB plug can be inserted both at the front and rear. The USB coupling can be inserted into the receiving passage in the module carrier and latched to said module carrier, and the module carrier can then be fixed to the holding device of the connecting apparatus.

As already mentioned in the introduction, the invention also relates to a connecting apparatus for the variable connection of cables, in particular telecommunications and data transmission cables, having a holding device for detachably fixing the module carrier of a cable connecting device to the connecting apparatus. In order to simplify mounting of the connecting apparatus and to ensure a connection, which can be mechanically loaded, between the module carrier of the cable connecting device and the connecting apparatus, it is proposed according to the invention that the connecting apparatus has at least one cable connecting device of the type described above. As already explained above, the cable connecting device which can be fixed to the holding device can be used to achieve vibration-resistant disposition of the cable connecting device on the holding device. The connecting apparatus according to the invention is therefore suitable in particular for use in harsh environmental conditions, as are often encountered, for example, in industrial establishments.

The holding device preferably has a front plate to which the module carrier can be detachably connected, and also a support plate onto which the module carrier can be placed. The module carrier can preferably be placed, along its entire length, on the support plate since this has the advantage that the module carrier can be fixed to the holding device in a particularly reliable manner. Vibrations of the module carrier can be kept very low by virtue of the module carrier bearing, over its entire length, against the support plate.

The front plate is preferably integrally connected to the support plate. Particularly, provision may be made for the front and support plates to be in the form of an integral sheet-metal part.

In order to increase the mechanical stability of the holding device, it is advantageous when the lower face of the support plate has at least one inverted trough with a trough base wall and with trough side walls which extend obliquely from said trough base wall, it being possible for the module carrier to be placed on the face of the trough base wall which is directed away from the inverted trough. The face of the trough base wall which is directed away from the inverted trough can form a support area against which the module carrier can bear flat. The support area is easily accessible to the user since, on account of the inverted-trough-like configuration of the support plate, said support area protrudes from the other regions of the support plate.

It is advantageous when guide elements for guiding cables are located on the support plate. The guide elements can be formed, for example, as cable rings which engage around a cable that can be connected to the rear of a cable connecting device. In an advantageous configuration, the guide elements are integrally connected to the support plate.

It is advantageous when holding arms for strain-relief elements are disposed on the support plate. The strain-relief elements used can be, for example, cable ties which are known per se and which can engage around a holding arm and a cable, which is introduced to a cable connecting device, in the circumferential direction. It is beneficial when the holding arms are integrally connected to the support plate.

In order to keep the weight of the holding device low, it is advantageous when the support plate has one or more punched-out portions.

In a particularly preferred configuration of the connecting apparatus according to the invention, the front plate has a large number of connection openings into each of which a cable connecting device can be inserted in the mounting direction, it being possible for the module carrier to be latched to the holding device. Provision may be made, for example, for the front plate to comprise twenty-four connection openings which can each accommodate a cable connecting device. The cable connecting devices can be inserted at the rear of the connection openings, with the insertion direction corresponding to the mounting direction of the connecting module when inserted into the receiving passage in the module carrier. The connecting apparatus, including the corresponding cable connecting devices, is therefore mounted wholly axially from the rear with respect to the connection openings in the front plate. A pivoting or tilting movement for inserting the connecting module into the module carrier and/or inserting the module carrier into a cutout in the holding device is not necessary.

The front plate is preferably of double-walled configuration and comprises a front wall and a rear wall, said walls comprising connection openings which are oriented so as to be aligned with one another. An intermediate space into which at least one latching element of the module carrier can engage may be located between the front wall and the rear wall.

The module carrier preferably engages behind the connection opening in the rear wall. The module carrier can have, for example, a latching hook which passes through the connection opening in the rear wall from behind and enters the intermediate space between the rear wall and the front wall of the front plate by way of a free end region.

It is advantageous when the module carrier can be positively connected to the holding device, since this permits a connection between the module carrier and the holding device, which connection can be particularly highly mechanically loaded, so that vibration of the cable connecting device is suppressed at the holding device of the connecting apparatus.

The holding device preferably has a large number of guide cutouts into each of which a guide part of a module carrier can positively engage. Provision of guide cutouts in the holding device makes it easier to fix the module carriers since these module carriers can each be inserted, by way of corresponding guide parts, into a guide cutout and can be displaced relative to the guide cutouts until they reach a final mounting position. In the final mounting position, the module carriers can be fixed to the holding device by means of latching elements.

In an advantageous embodiment, the guide cutouts are each surrounded by a support area onto which a module carrier can be placed flat.

The guide parts of the module carriers can each comprise two guide wings which protrude outward from a wall of the module carrier, and the guide cutouts of the holding device can each have two guide edges, the guide wings of a guide part each engaging around a guide edge, transverse to the mounting direction.

It is advantageous when the guide wings form blocking elements which prevent a spreading movement of the receiving passage in the module carrier fixed to the holding device. As already explained, the connecting module can be secured in the module carrier in a structurally simple manner by ensuring that the receiving passage in the module carrier can no longer be spread as soon as the module carrier is fixed to the holding device. In this case, the guide wings which each engage around a guide edge of a guide cutout can prevent a spreading movement of the receiving passage transverse to the mounting direction in a simple manner, that is to say the guide wings can form the blocking elements already described above.

In a preferred configuration of the connecting apparatus according to the invention, the connecting module can be inserted into the module carrier in the mounting direction and can be latched to said module carrier, and the module carrier can then be inserted into the holding device in the mounting direction, it being possible for said module carrier to be latched to a front plate of the holding device and to be positively connected to a support plate of the holding device. The connecting apparatus according to the invention is distinguished by simple handling and by virtually vibration-free mounting of the cable connecting devices on the holding device.

The following description of a preferred embodiment of the invention serves for a more detailed explanation in connection with the drawings.

BRIEF DESCRIPTION OF THE DRAWINGS

FIG. 1: shows a perspective illustration of a connecting apparatus according to the invention having cable connecting devices, as seen obliquely from the front;

FIG. 2: shows a perspective illustration of the connecting apparatus from FIG. 1, as seen obliquely from the rear;

DETAILED DESCRIPTION OF THE INVENTION

Figure 3:
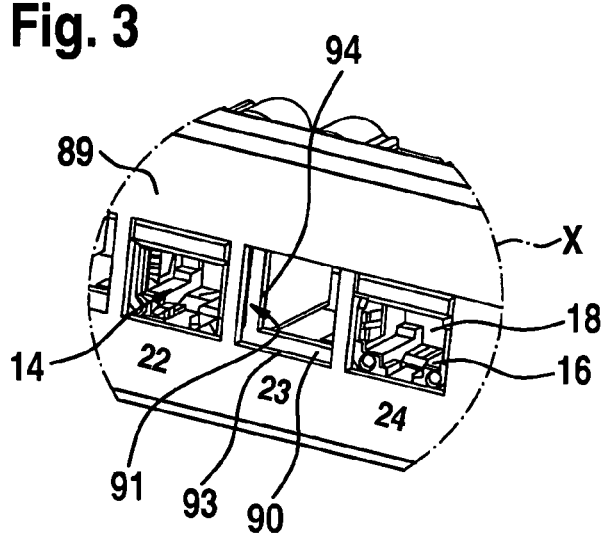
FIG. 3: shows an enlarged illustration of detail X from FIG. 1.
Figure 4:
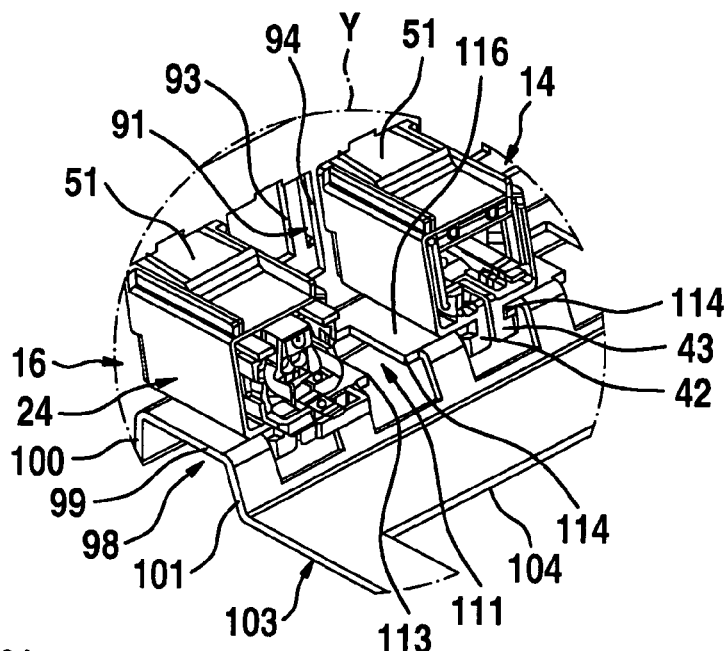
FIG. 4: shows an enlarged illustration of detail Y from FIG. 2.
Figure 5:
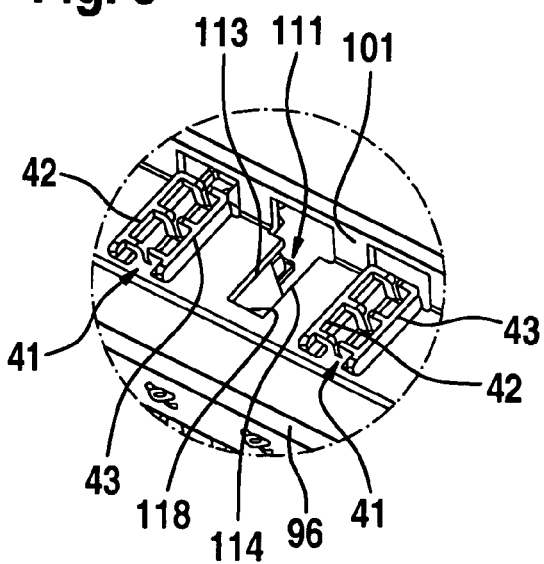
FIG. 5: shows an enlarged view of detail Y from FIG. 2 from below.

The drawing shows schematically a connecting apparatus, which is denoted by reference symbol 10 overall, for the variable connection of cables. Connecting apparatuses of this type are also called patch panels or jumpering panels and permit connections between two cables, in particular two telecommunications or data connection cables, to be variably established. The connecting apparatus 10 has a holding device 12 to which a maximum of twenty-four cable connecting devices for connecting two cables in each case can be fixed. For reasons of clarity, only two cable connecting devices 14 and 16 are illustrated in FIGS. 1 and 2. Said cable connecting devices each have, at their front end, a socket 18 into which a plug that is connected to the free end of a cable can be inserted. The cable connecting devices 14 and 16 are each provided with a conductor receiving part 20 at the rear, it being possible for the conductors of a cable which can be connected at the rear to be inserted into said conductor receiving part. Within the cable connecting device, contact elements which are disposed in the socket are electrically connected to the conductor receiving part 20, so that an electrical connection can be established between two cables when the plug is inserted. Establishing electrical connections of this type is known per se to the person skilled in the art.

Figure 6:
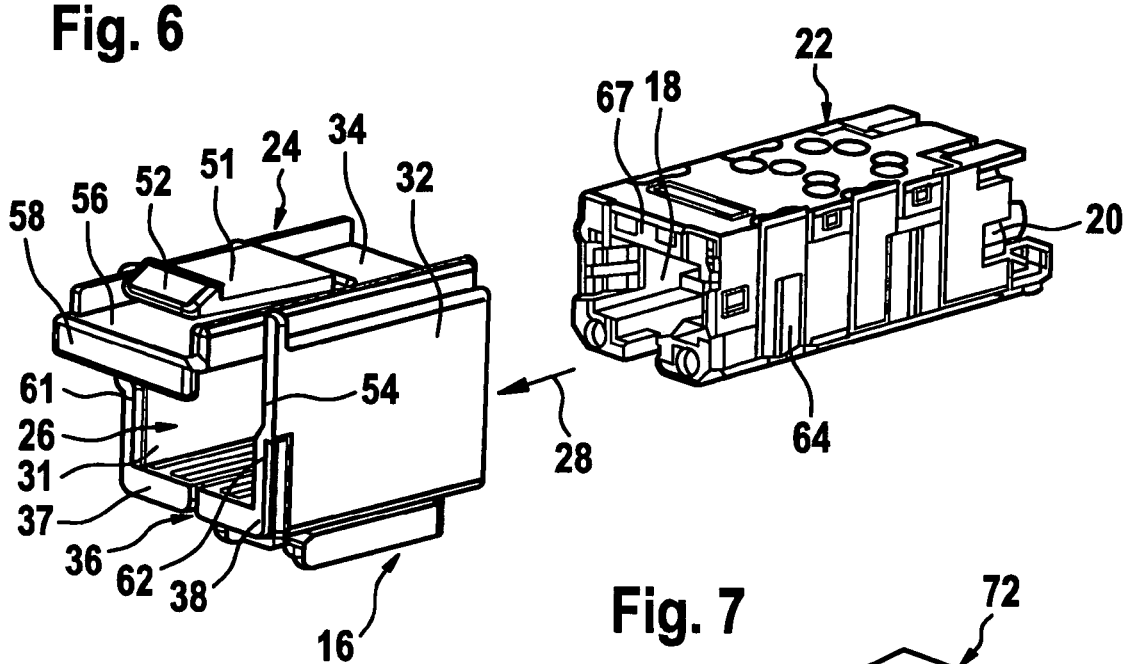
FIG. 6: shows, in the form of an exploded drawing, a perspective illustration of a cable connecting device according to the invention that has a module carrier and a connecting module.

The cable connecting device 16 is illustrated on an enlarged scale in the form of an exploded drawing in FIG. 6. Said cable connecting device comprises, like the cable connecting device 14, a connecting module 22 and a module carrier 24. The connecting module 22 has a first cable connecting element in the form of the socket 18 at the front, and a second cable connecting element in the form of the conductor receiving part 20 at the rear.

Figure 10:
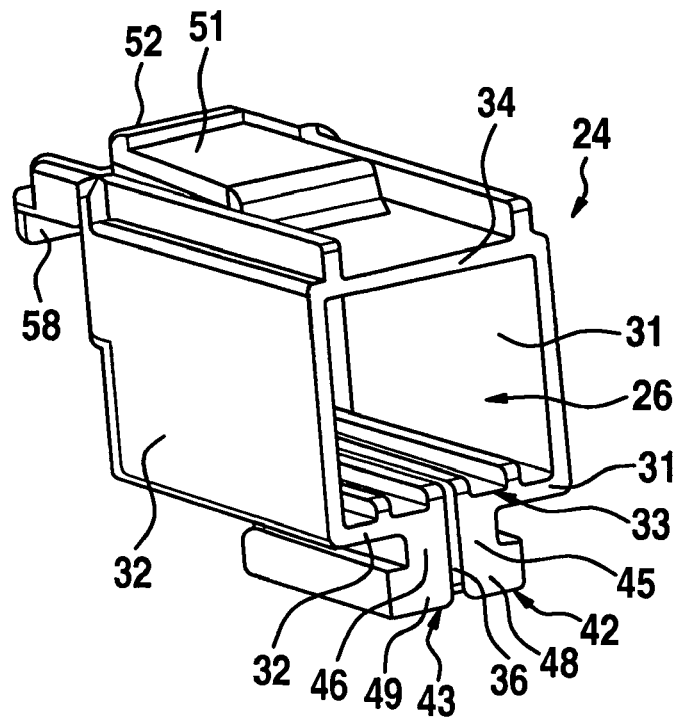
FIG. 10: shows a perspective illustration of the module carrier from FIG. 6, as seen obliquely from the rear.
Figure 11:
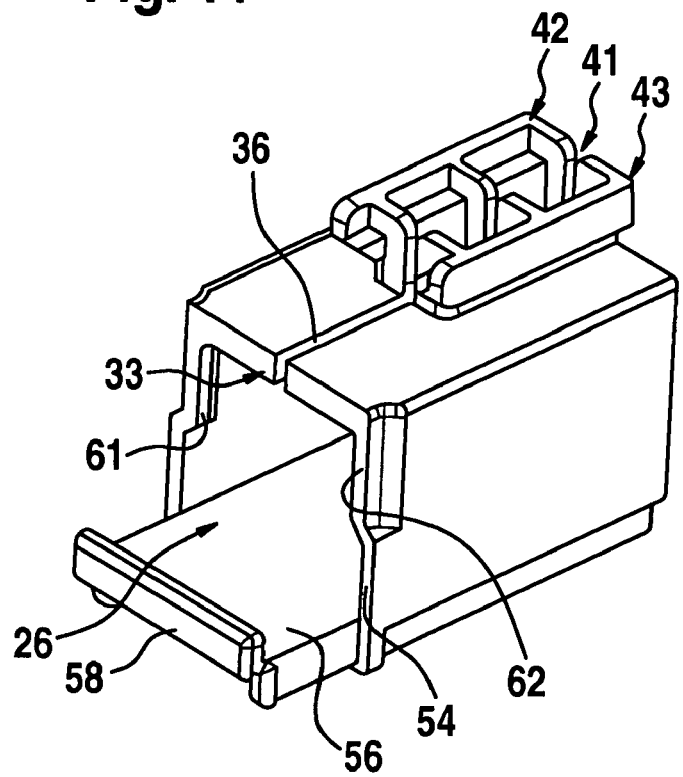
FIG. 11: shows a perspective illustration of the module carrier from FIG. 6, as seen obliquely from below.

The module carrier 24 is formed as an injection-molded plastics part and forms a receiving passage 26 into which the connecting module 22 can be inserted in a mounting direction indicated by arrow 28. The receiving passage 26 is formed by side walls 31, 32 which are situated opposite one another, and by a base wall 33 and a top wall 34, this being clear, in particular, from FIG. 6 and also from FIGS. 10 and 11. The base wall 33 has a gap 36 over its entire length, said gap dividing the base wall 33 into a first base wall portion 37 and a second base wall portion 38. On its outer face which is directed away from the receiving passage 26, the base wall 33 has a guide part 41 with a first guide wing 42 and a second guide wing 43. The first guide wing 42 is integrally formed on the outside of the first base wall portion 37, and the second guide wing 43 is integrally formed on the outside of the second base wall portion 38. The two guide wings 42, 43 are each formed with an L-shaped cross-section and comprise a first limb 45 or 46, which protrudes outward from the base wall 33 in a perpendicular manner, and a second limb 48 or 49 which is oriented parallel to the base wall 33 and is integrally joined to the free end of the respective first limb 45, 46. The two second limbs 48, 49 face away from one another, and the gap 36 extends between the first limbs 45, 46, in the same way as between the two base wall portions 37 and 38.

On its outer face which is directed away from the receiving passage 26, the top wall 34 has a latching element in the form of a latching hook 51 which can be deformed transverse to the mounting direction 28. The latching hook 51 is integrally formed approximately in the center of the outside of the top wall 34 with respect to the mounting direction 28 and projects, by way of the tip 52 of its hook, beyond a front end 54 of the receiving passage 26.

An axial extension 56 is integrally formed on the top wall 34 in the region of the front end 54, said extension having at its free end a stop element in the form of a stop bar 58. The stop bar 58 protrudes downward from the axial extension 56 and therefore projects into the cross-section of the receiving passage 26.

The side walls 31 and 32, which are situated opposite one another, each have a latching element, in the form of a latching projection 61, 62 which projects into the receiving passage 26, immediately adjacent the front end 54. The latching projections 61, 62 interact with corresponding latching receptacles which are integrally formed in the side of the connecting module 22. FIG. 6 shows only one latching receptacle 64 of the connecting module 22, a latching receptacle of identical shape being located on the opposite side of the connecting module 22.

In order to assemble the cable connecting device 16, the connecting module 22 can be inserted into the receiving passage 26 in the module carrier 24 in the mounting direction 28 until the end face 67 of the connecting module 22 comes to bear against the stop bar 58. In this position, the latching projections 61 and 62 latch into the corresponding latching receptacles 64 of the connecting module 22, which has therefore reached its latching position within the receiving passage 26. When the connecting module 22 is inserted into the receiving passage 26, said receiving passage spreads apart slightly transverse to the mounting direction 28 until the latching projections 61, 62 can enter the associated latching receptacles. The spreading movement is ensured by the provision of the gap 36 and by the selection of an elastically deformable plastics material for producing the module carrier 24.

Figure 7:
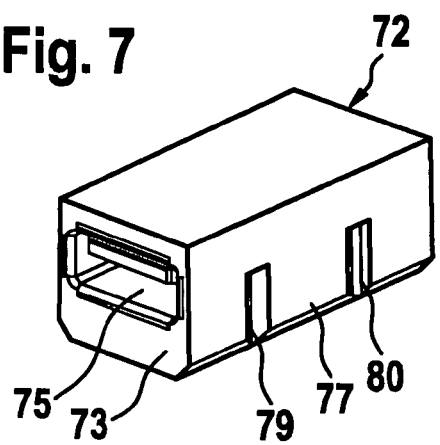
FIG. 7: shows a perspective illustration of a connecting module which is used as an alternative in a cable connecting device according to the invention.
Figure 8:
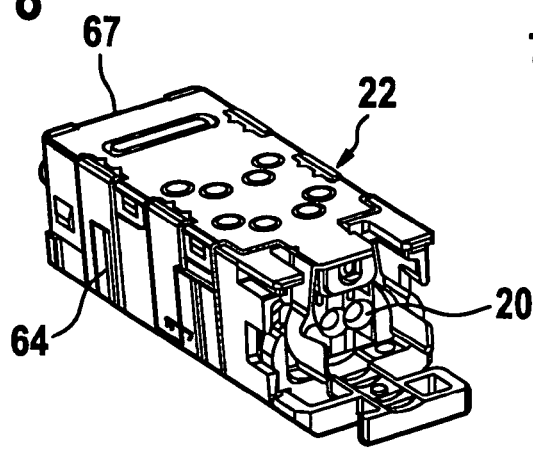
FIG. 8: shows a perspective illustration of the connecting module from FIG. 6, as seen obliquely from the rear.
Figure 9:
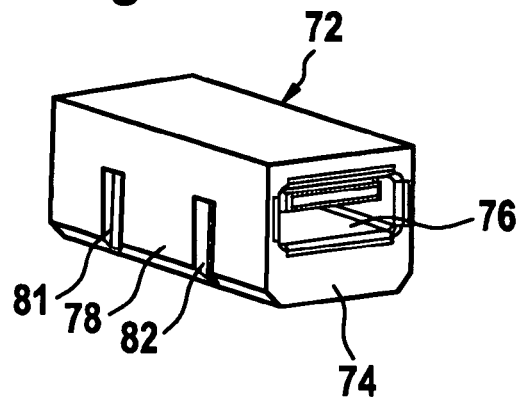
FIG. 9: shows a perspective illustration of the connecting module from FIG. 7 which is used as an alternative, as seen obliquely from the rear.

As an alternative to the connecting module 22, the connecting module 72 which is illustrated in FIG. 7 can also be inserted into the receiving passage 26 in the module carrier 24. Said connecting module 72 is configured in the form of a USB coupling and has a socket 75 and, respectively 76, both on its front face 73 and on its rear face 74, it being possible for a complementary USB plug to be inserted into each of said sockets. On its longitudinal faces 77 and 78, the connecting module 72 has, in each case, two latching receptacles 79, 80 and, respectively, 81, 82, which are disposed at a spacing from one another. Therefore, either the front face or the rear face of said connecting module can be inserted into the receiving passage 26 in the module carrier 24 in the mounting direction 28, with said connecting module receiving a latching projection 61 or 62 of the receiving passage 26 in the latching receptacles 79 and 81 or in the latching receptacles 80, 82 when said connecting module reaches the stop bar 58. The connecting module 72 can therefore be inserted into the receiving passage 26 in a particularly simple manner since it is not necessary to take account of the orientation assumed by the connecting module 72.

After the connecting module 22 or else the connecting module 72 has been inserted into the receiving passage 26 in the module carrier 24 and latched to said module carrier, the module carrier 24 can be fixed to the holding device 12. Said holding device comprises a front plate 86 and a support plate 87. The front and support plates 86, 87 are integrally connected to one another and are in the form of a bent sheet-metal part. The front plate 86 is of double-walled configuration and comprises a front wall 89 and a rear wall 90 which is disposed at a spacing from said front wall, said front wall and rear wall delimiting an intermediate space 91 between them. The front wall 89 and the rear wall 90 have a total of twenty-four connection openings of identical configuration, with a connection opening 93 in the front wall 89 in each case being aligned with a connection opening 94 in the rear wall 90.

The support plate 87 adjoins a lower edge 96 of the front wall 89 and has, on its lower face, an inverted trough 98 with a flat trough base 99, which is oriented perpendicular to the front wall 89 and to the rear wall 90, and a front trough wall 100 which is oriented obliquely to said trough base and is on the front plate 86 side of the trough, and a rear trough wall 101 which is likewise oriented obliquely to the trough base 99 and is remote from the front plate 86.

A central support plate portion 103 with punched-out portions 104 of large size integrally adjoins the rear trough wall 101. A rear support plate portion 106 adjoins the central support plate portion 103 such that it is remote from the front plate 86, said rear support plate portion having a large number of semicircular guide elements 108 for guiding cables and having a large number of holding arms 109 to which strain-relief elements for cables that are to be connected can be secured. The guide elements 108 and the holding arms 109 are associated with a pair of connection openings 93, 94 in each case.

In the region of the trough base 99 and the rear trough wall 101, the support plate 87 has, in each case associated with a pair of connection openings 93, 94, guide cutouts 111 with guide edges 113, 114 which are disposed in the region of the trough base 99 and run parallel to one another. That face of the trough base 99 which is directed away from the inverted trough 98 forms a support area 116 which surrounds the guide cutouts 111.

For the purpose of fixing the cable connecting devices 14, 16, the module carrier 24 can be placed, by way of its base wall 33, on the support area 116 of the support plate 87 and the guide part 41 can then be positively guided into the guide cutout 111 by way of the two guide wings 42, 43. In the process, the two guide wings 42, 43 each engage around a guide edge 113 and, respectively, 114, so that the receiving passage 26 can no longer be spread transverse to the mounting direction 28. The guide wings 42, 43 therefore represent securing elements which block a spreading movement of the receiving passage 26 transverse to the mounting direction 28 when the module carrier 24 is fixed as intended to the holding device 12 of the connecting apparatus 10.

The module carrier 24 can be inserted into the guide cutout 111 in the mounting direction 28 until the guide wings 42, 43 come to bear, in the mounting direction, against an end edge 118 of the guide cutout 111 which is oriented perpendicular to the guide edges 113 and connects said guide edges to one another. At the same time, the tip 52 of the latching hook 51 of the module carrier 24 enters the intermediate space 91 between the front wall 89 and the rear wall 90 and engages behind the rear wall 90. This establishes a latching connection between the module carrier 24 and the front plate 86. The module carrier 24 is therefore secured to the holding device 12 in the axial direction by means of the latching hook 51, and the module part 24 is secured transverse to the mounting direction 28 by means of the positive connection between the guide part 41 and the guide cutout 111. At the same time, the positive connection between the guide part 41 and the guide cutout 111 ensures that the receiving passage 26 cannot be spread transverse to the mounting direction 28 and as a result the latching connection between the module carrier 24 and the connecting module 22 or 72 which is inserted into the receiving passage 26 cannot be detached.

The configuration of the connecting apparatus 10 according to the invention therefore permits cable connecting devices 14, 16 to be fixed to the holding device 12 with an extremely low level of vibration and such that mechanical loads can be borne, it being possible for the cable connecting devices 14, 16 to be mounted in a simple manner and it not being possible for said cable connecting devices to become unintentionally detached from the holding device 12.

The invention claimed is:

1. Cable connecting device for a connecting apparatus for variable connection of cables, comprising:
   a connecting module which has cable connecting elements for detachably connecting two cables, and
   a module carrier adapted to be detachably connected to the connecting module and to be detachably fixed to a holding device of the connecting apparatus,
   wherein:
   the connecting module is adapted to be inserted into a receiving passage in the module carrier in a mounting direction and to be latched to the module carrier in a latching position, and
   the receiving passage has two side walls which are situated opposite one another and on which in each case at least one latching means is disposed, said latching means interacting with a corresponding latching means of the connecting module in order to establish a latching connection.

2. Cable connecting device according to claim 1, wherein the connecting module projects from the front and/or rear of the receiving passage in the latching position.

3. Cable connecting device for a connecting apparatus for variable connection of cables, comprising:

a connecting module which has cable connecting elements for detachably connecting two cables, and a module carrier adapted to be detachably connected to the connecting module and to be detachably fixed to a holding device of the connecting apparatus, wherein:

the connecting module is adapted to be inserted into a receiving passage in the module carrier in a mounting direction and to be latched to the module carrier in a latching position, and the receiving passage is adapted to be elastically spread transverse to the mounting direction when the module carrier is not fixed to the holding device of the connecting apparatus.

4. Cable connecting device according to claim 3, wherein the receiving passage has two side walls which are situated opposite one another and on which in each case at least one latching means is disposed, said latching means interacting with a corresponding latching means of the connecting module in order to establish a latching connection.

5. Cable connecting device according to claim 3, wherein the module carrier has blocking elements which block a spreading movement of the receiving passage transverse to the mounting direction when the module carrier is fixed as intended to the holding device of the connecting apparatus.

6. Cable connecting device for a connecting apparatus for variable connection of cables, comprising:

a connecting module which has cable connecting elements for detachably connecting two cables, and a module carrier adapted to be detachably connected to the connecting module and to be detachably fixed to a holding device of the connecting apparatus, wherein:

the connecting module is adapted to be inserted into a receiving passage in the module carrier in a mounting direction and to be latched to the module carrier in a latching position, and the module carrier surrounds the connecting module in the latching position in the circumferential direction, a gap being formed which extends along the entire module carrier in the mounting direction.

7. Cable connecting device according to claim 6, wherein the gap extends along a wall of the receiving passage, blocking elements being located on the outer face of the wall, which outer face is directed away from the receiving passage, on both sides of the gap, said blocking elements blocking a spreading movement of the receiving passage transverse to the mounting direction when the module carrier is fixed as intended to the holding device of the connecting apparatus.

8. Cable connecting device according to claim 7, wherein a latching element is disposed on the outside of a face of the module carrier which is remote from the gap.

9. Cable connecting device for a connecting apparatus for variable connection of cables, comprising:

a connecting module which has cable connecting elements for detachably connecting two cables, and a module carrier adapted to be detachably connected to the connecting module and to be detachably fixed to a holding device of the connecting apparatus, wherein:

the connecting module is adapted to be inserted into a receiving passage in the module carrier in a mounting direction and to be latched to the module carrier in a latching position, and the module carrier has a stop element against which the connecting module abuts in the latching position, the stop element projecting forward out of the receiving passage in the mounting direction.

10. Connecting apparatus for the variable connection of cables, comprising:

at least one cable connecting device, and a holding device for detachably connecting the module carrier of the cable connecting device to the connecting apparatus, wherein said cable connecting device comprises:

a connecting module which has cable connecting elements for detachably connecting two cables, and a module carrier adapted to be detachably connected to the connecting module and to be detachably fixed to the holding device of the connecting apparatus, the connecting module being adapted to be inserted into a receiving passage in the module carrier in a mounting direction and to be latched to the module carrier in a latching position, wherein the holding device comprises:

a front plate to which the module carrier can be detachably connected, and a support plate onto which the module carrier can be placed, the front plate being integrally connected to the support plate, and wherein the front plate is of double-walled configuration and comprises a front wall and a rear wall, said walls having connection openings which are oriented so as to be aligned with one another.

11. Connecting apparatus for the variable connection of cables, comprising:

at least one cable connecting device, and a holding device for detachably connecting the module carrier of the cable connecting device to the connecting apparatus, wherein said cable connecting device comprises:

a connecting module which has cable connecting elements for detachably connecting two cables, and a module carrier adapted to be detachably connected to the connecting module and to be detachably fixed to the holding device of the connecting apparatus, the connecting module being adapted to be inserted into a receiving passage in the module carrier in a mounting direction and to be latched to the module carrier in a latching position, wherein:

the connecting module is adapted to be inserted into the module carrier in the mounting direction and to be latched to said module carrier, and the module carrier is adapted to be inserted into the holding device in the mounting direction after insertion of the connecting module into the module carrier, it being possible for said module carrier to be latched to a front plate of the holding device and to be positively connected to a support plate of the holding device.

12. Connecting apparatus according to claim 11, wherein the front plate is integrally connected to the support plate.

13. Connecting apparatus according to claim 12, wherein guide elements for guiding cables are located on the support plate.

14. Connecting apparatus according to claim 12, wherein holding arms for strain-relief elements are disposed on the support plate.

15. Connecting apparatus according to claim 12, wherein the front plate is of double-walled configuration and comprises a front wall and a rear wall, said walls having connection openings which are oriented so as to be aligned with one another.

16. Connecting apparatus according to claim 15, wherein the module carrier engages behind a connection opening in the rear wall.

17. Connecting apparatus for the variable connection of cables, comprising:
- at least one cable connecting device, and
- a holding device for detachably connecting the module carrier of the cable connecting device to the connecting apparatus, wherein said cable connecting device comprises:
- a connecting module which has cable connecting elements for detachably connecting two cables, and
- a module carrier adapted to be detachably connected to the connecting module and to be detachably fixed to the holding device of the connecting apparatus, the connecting module being adapted to be inserted into a receiving passage in the module carrier in a mounting direction and to be latched to the module carrier in a latching position, wherein:
- the holding device has a large number of guide cutouts into each of which a guide part of a module carrier can be positively inserted,
- the guide part comprises two guide wings which protrude outward from a wall of the module carrier, and
- the guide cutouts each have two guide edges, the guide wings of a guide part each engaging around a guide edge of a guide cutout, transverse to the mounting direction.

18. Connecting apparatus according to claim 17, wherein the guide wings form blocking elements which prevent a spreading movement of the receiving passage of a module carrier introduced into a guide cutout.

* * * * *